US011143102B2

(12) United States Patent
Del Turco et al.

(10) Patent No.: US 11,143,102 B2
(45) Date of Patent: Oct. 12, 2021

(54) WASTE HEAT RECOVERY CASCADE CYCLE AND METHOD

(71) Applicant: Nuovo Pignone Tecnologie Srl, Florence (IT)

(72) Inventors: Paolo Del Turco, Florence (IT); Jury Auciello, Florence (IT); Stefano Capodanno, Florence (IT); Simone Amidei, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 16/075,645

(22) PCT Filed: Feb. 20, 2017

(86) PCT No.: PCT/EP2017/053813
§ 371 (c)(1),
(2) Date: Aug. 4, 2018

(87) PCT Pub. No.: WO2017/144422
PCT Pub. Date: Aug. 31, 2017

(65) Prior Publication Data
US 2019/0048747 A1 Feb. 14, 2019

(30) Foreign Application Priority Data
Feb. 22, 2016 (IT) .................. 102016000018102

(51) Int. Cl.
*F02C 6/18* (2006.01)
*F01K 23/10* (2006.01)
*F02C 7/143* (2006.01)

(52) U.S. Cl.
CPC ............... *F02C 6/18* (2013.01); *F01K 23/10* (2013.01); *F02C 7/143* (2013.01)

(58) Field of Classification Search
CPC .. F01K 23/10; F01K 23/04; F02C 6/18; F02C 1/007; F02C 1/04; F02C 1/10; Y02E 20/16; F05D 2220/72
See application file for complete search history.

(56) References Cited

U.S. PATENT DOCUMENTS

2004/0020206 A1* 2/2004 Sullivan ................ F01K 23/101
60/670
2012/0131919 A1 5/2012 Held et al.
(Continued)

FOREIGN PATENT DOCUMENTS

| CH | 276514 A | 7/1951 |
|---|---|---|
| RU | 2188960 C1 | 9/2002 |
| WO | 2015/034987 A1 | 3/2015 |

OTHER PUBLICATIONS

Search Report and Written Opinion issued in connection with corresponding IT Application No. 102016000018102 dated Oct. 6, 2016.

(Continued)

*Primary Examiner* — William H Rodriguez
(74) *Attorney, Agent, or Firm* — Baker Hughes Patent Org.

(57) ABSTRACT

A power conversion system including a first working fluid circuit and a second working fluid circuit. Heat, e.g. waste heat from a top, high-temperature thermodynamic cycle, is transferred to working fluid circulating in the first working fluid circuit and expanded in a first expander to generate useful mechanical power. A heat transfer arrangement is provided, between the first working fluid circuit and second working fluid circuit, configured for transferring low-temperature heat from the first working fluid circuit to the second working fluid circuit. In the second working fluid circuit working fluid is processed, which is expanded in at least one expander to generate useful mechanical power (Continued)

which is used to power a pump or compressor of the first working fluid circuit. The heat of the expanded gas is further used in a second recuperator to pre-heat the first working fluid.

18 Claims, 5 Drawing Sheets

(56) References Cited

U.S. PATENT DOCUMENTS

2018/0313232 A1* 11/2018 Auciello ................ F01K 23/10
2020/0191021 A1*  6/2020 Santini .................. F25B 11/04

OTHER PUBLICATIONS

International Search Report and Written Opinion issued in connection with corresponding PCT Application No. PCT/EP2017/053813 dated Jun. 8, 2017.
International Preliminary Report on Patentability issued in connection with corresponding PCT Application No. PCT/EP2017/053813 dated Aug. 28, 2018.

* cited by examiner

WASTE HEAT RECOVERY CASCADE CYCLE AND METHOD

FIELD OF THE INVENTION

The present disclosure relates to power conversion systems. Some embodiments disclosed herein concern power conversion systems using low-temperature thermodynamic cycles, such as a Rankine cycles or a Brayton cycles, to recover heat from a heat source, e.g. heat from a concentrated solar power plant, or else waste heat from any suitable industrial plant. Some embodiments specifically provide for low-temperature thermodynamic cycles arranged in a cascade configuration with a top, high-temperature thermodynamic cycle.

BACKGROUND OF THE INVENTION

Waste heat is often produced as a byproduct of industrial processes, where heat from streams of high-temperature fluids must be removed.

Typical industrial processes which produce waste heat are those using gas turbines for mechanical drive as well as power generation applications, gas engines and combustors. These processes typically release exhaust combustion gases into the atmosphere at temperatures considerably higher than the ambient temperature. The exhaust gas contains waste heat that can be usefully exploited, e.g. to produce additional mechanical power in a bottom, low-temperature thermodynamic cycle. The waste heat of the exhaust gas provides thermal energy to the bottom, low-temperature thermodynamic cycle, wherein a fluid performs cyclic thermodynamic transformations, exchanging heat at a lower temperature with the environment.

Waste heat can be converted into useful mechanical power by a variety of heat engine systems that employ thermodynamic cycles, such as steam Rankine cycles, organic Rankine or Brayton cycles, $CO_2$ cycles or other power cycles. Rankine, Brayton and similar thermodynamic cycles are typically steam-based processes that recover and utilize waste heat to generate steam/vapor for driving a turbine, a turboexpander or the like. The pressure and thermal energy of the steam or vapor is partly converted into mechanical energy in the turboexpander, turbine or other power-converting machine and finally used to drive a load, such as an electric generator, a pump, a compressor or other driven device or machinery.

Conversion of waste heat into useful mechanical power can substantially improve the overall efficiency of the power conversion system, contributing to the reduction of fuel consumption and reducing the environmental impact of the power conversion process.

Similar advantages in terms of energy saving and reduction of environmental impact of human industrial activities can be envisaged when other low-temperature heat sources are exploited for mechanical power production, e.g. solar plants, where solar energy is concentrated and used to directly or indirectly heat a process fluid which can be processed in a thermodynamic cycle.

Therefore, high-efficiency methods and systems for transforming low-temperature thermal power into useful mechanical or electrical power are desirable.

SUMMARY OF THE INVENTION

According to one aspect, power conversion systems are disclosed herein, for converting heat from a relatively low-temperature heat source, into useful power with improved overall efficiency. More specifically, disclosed herein are embodiments of a power conversion system, comprising a first working fluid circuit configured to flow a first working fluid therethrough. The system further comprises a heater configured to circulate the first working fluid in heat exchange relationship with a heat source to vaporize the first working fluid. The heat source can be a waste heat source, such as exhaust gases from an internal combustion engine (e.g. a reciprocating internal combustion engine, or a gas turbine engine). In other embodiments the heat source can be a concentrated solar plant, a waste heat source of an industrial facility or any other source of heat.

The first working fluid circuit can further comprise a first expander configured to expand the first working fluid therein and generate mechanical power therewith and a first pump or compressor. The first working fluid thus undergoes cyclical thermodynamic transformations of heating, expanding, condensing/cooling, pumping, with which part of the heat power delivered to the first working fluid by the heat source is converted into useful mechanical power by the first expander.

The power conversion system further comprises a second working fluid circuit to flow a second working fluid through which a second working fluid flows. the second working fluid can have the same chemical composition as the first working fluid or a different chemical composition.

A heat transfer arrangement is further provided, which is configured for transferring heat from a low pressure side of the first working fluid circuit to a high pressure side of the second working fluid circuit and vaporize the second working fluid.

The second working fluid circuit comprises an expander arrangement configured to expand the second working fluid and generate mechanical power therewith. The second working fluid circuit further comprises a second pump or compressor for processing the second working fluid, such that the latter undergoes cyclic thermodynamic transformations in the second working fluid circuit, whereby part of the heat transferred from the first working fluid circuit to the second working fluid circuit is converted into useful mechanical power by the expander arrangement.

In some embodiments, the first pump or compressor of the first working fluid circuit is drivingly coupled to the expander arrangement and driven by mechanical power generated therewith.

According to some embodiments, also the second pump or compressor can be driven by mechanical power generated by the expander arrangement. In other embodiments, the second pump or compressor can be powered by an electric motor.

Mechanical power generated by the first expander can be used as such, e.g. for mechanical drive applications. These may include, but are not limited to driving a turbomachine, such as a compressor. In other embodiments part or the entire mechanical power generated by the first expander can be converted into electric power. A part of said electric power can be used to drive an electric motor which drives the second pump or compressor.

When both the first pump or compressor and the second pump or compressor are driven by mechanical power generated by the expander arrangement, this latter may include a single expander, which is drivingly coupled to both first and second pump or compressor. In other embodiments, the expander arrangement may include two expanders, one for each pump or compressor.

According to a further aspect, a method for producing useful power from heat from a heat source, is disclosed. According to embodiments disclosed herein, the method comprises the following steps:

circulating a first working fluid by means of a first pump or compressor through a first working fluid circuit having a high pressure side and a low pressure side, wherein the high pressure side is in heat exchange relationship with the heat source and the low pressure side is in heat exchange relationship with a second working fluid circuit;

transferring thermal energy from the heat source to the first working fluid;

expanding the first working fluid through a first expander arranged between the high pressure side and the low pressure side of the first working fluid circuit, and generate mechanical power therewith;

transferring low-temperature heat from the first working fluid circuit to the second working fluid circuit; wherein the second working fluid circuit comprises a high pressure side and a low pressure side, an expander arrangement between the high pressure side and the low pressure side, and a second pump or compressor between the low pressure side and the high pressure side;

expanding a second working fluid circulating in the second working fluid circuit in the expander arrangement and generating mechanical power therewith;

driving the first pump or compressor by means of mechanical power generated by the expander arrangement.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of embodiments of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. Embodiments of the invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of embodiments of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following disclosure of exemplary embodiments reference is made to a combined hybrid thermodynamic cycle, including a top, high-temperature thermodynamic cycle, the low-temperature source whereof provides waste heat to a bottom, low-temperature thermodynamic cycle system. It shall, however, be understood that according to other embodiments, the power conversion system disclosed herein can be used to exploit heat power at relatively low temperatures from other heat sources, e.g. waste heat from other industrial processes, such as geothermal processes.

In the following disclosure of exemplary embodiments reference is made to combined hybrid thermodynamic cycles, including a top, high-temperature thermodynamic cycle, temperature sink whereof represents a heat source providing waste heat to cascade-arranged a bottom, low-temperature thermodynamic cycles. It shall, however, be understood that according to other embodiments, the power systems disclosed herein can be used to exploit heat power at relatively low temperatures from other heat sources, e.g. waste heat from other industrial processes, such as geothermal processes.

The power conversion system is configured such that mechanical power generated by at least two expanders of two thermodynamic cycles in cascade-arrangement are used to generate mechanical power for driving at least one pump or compressor of said cycles, and for further providing useful mechanical power which can e.g. be converted into electric power.

Figure 1:
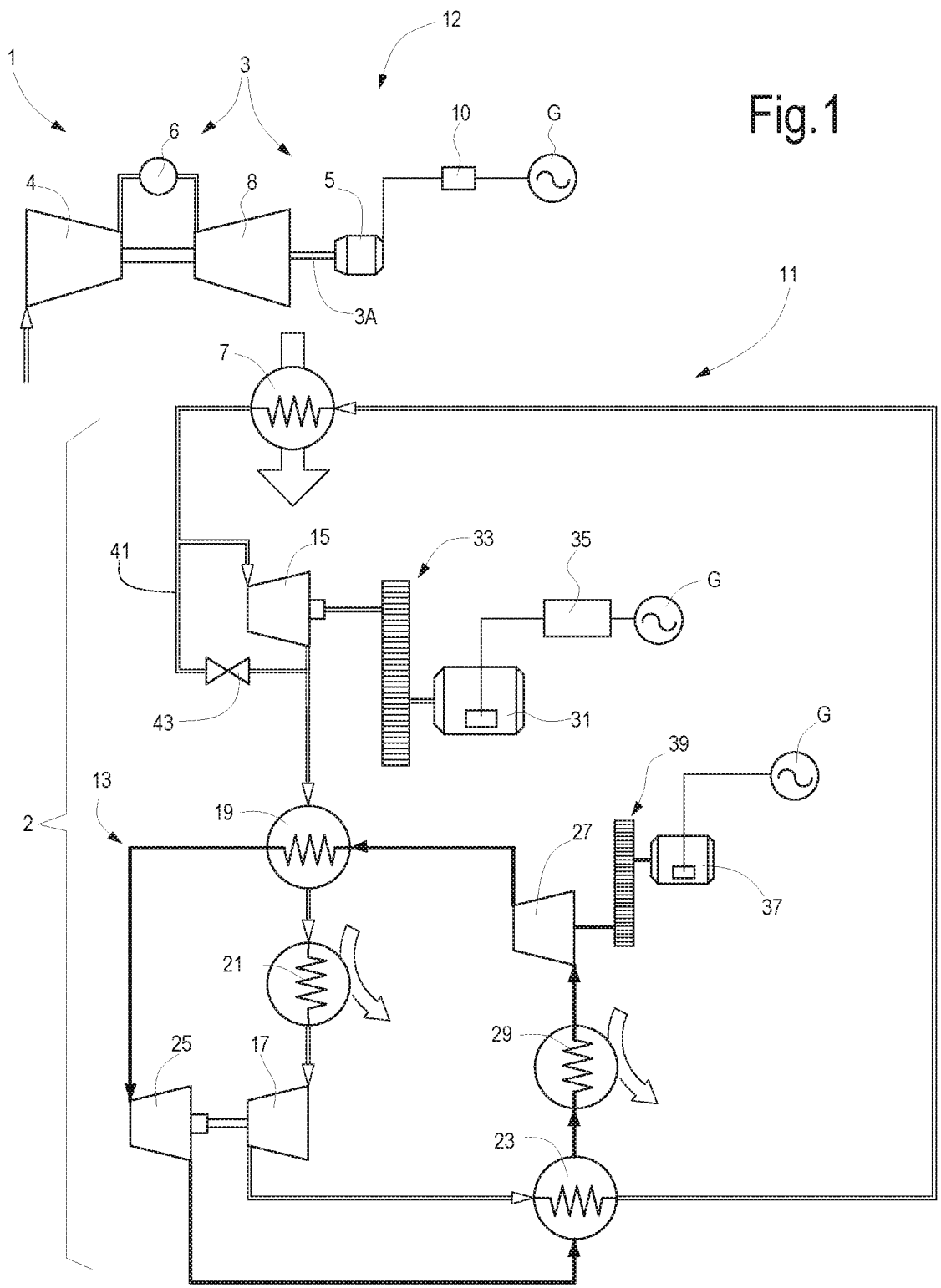
FIGS. 1 to 5 illustrate five exemplary embodiments of power systems including waste heat recovery cycles.

FIG. 1 schematically illustrates a combined power conversion system 12 including a top, high-temperature thermodynamic system 1 and a combined, bottom, low-temperature thermodynamic system 2. The top, high-temperature thermodynamic system 1 can be comprised of a gas turbine engine 3 and an electric generator 5 driven by mechanical power generated by the gas turbine engine 3 and available on the output driveshaft 3A of the latter. The gas turbine engine 3 can comprise a compressor section 4, a combustor section 6 and a turbine section 8. The electric generator 5 is connected to an electric power distribution grid G. An electric power conditioning device 10 can be interposed between the electric generator 5 and the electric power distribution grid G.

The bottom, low-temperature thermodynamic system 2 comprises a first working fluid circuit 11 and a second working fluid circuit 13. A first working fluid circulates in the first working fluid circuit 11 and is subject to cyclic thermodynamic transformations, by means of which heat from the top, high-temperature thermodynamic system 1 is partly converted into mechanical power and partly transferred, at a lower temperature, to the second working fluid circuit 13. In this latter, a second working fluid circulates and is subject to cyclic thermodynamic transformations, by means of which heat from the first working fluid circuit 11 is partly converted into additional mechanical power and partly discharged at a lower temperature at the cold side of the second working fluid circuit 13.

Thus, waste heat from the top, high-temperature thermodynamic system 1 is exploited in a two-step thermodynamic cycle producing mechanical power through expansion in respective expanders in the first and second working fluid circuits 11, 13.

The same working fluid can be used in the first and second working fluid circuits 11, 13, i.e. fluid having the same or substantially the same composition can be used in the two working fluid circuits. For instance, carbon dioxide ($CO_2$) can be exploited in the first working fluid circuit 11 and in the second working fluid circuit 13. In other embodiments, different working fluids, i.e. fluids having different chemical composition can be used in the two working fluid circuits 11, 13. In the first case, the two circuits can be placed in fluid communication, if needed, for instance to transfer part of the working fluid from the first working fluid circuit to the second working fluid circuit or vice-versa.

Suitable working fluids which can be used in the system described herein include, but are not limited to fluids commonly used in Organic Rankine Cycles (ORC), such as pentane and cyclopentane.

The thermodynamic cycle performed by the working fluid in the first working fluid circuit or in the second working fluid circuit or in both said working fluid circuits can be a supercritical cycle, i.e. the working fluid can be in a supercritical state in at least one portion of the thermodynamic cycle.

The first working fluid circuit 11 comprises a heater, wherein the first working fluid of the first working fluid circuit is heated and evaporated. The heater can be a waste heat recovery exchanger 7, which is in heat exchange relationship with the exhaust combustion gas flow from the gas turbine engine 1. Heat can be exchanged directly in the waste heat recovery heat exchanger 7, from the exhaust combustion gas to the working fluid that circulates in the first working fluid circuit 11 of the low-temperature thermodynamic system 2. In other embodiments, an intermediate heat transfer loop can be provided, wherein a heat transfer fluid, such as diathermic oil or the like, circulates to transfer heat from a first heat exchanger, in heat exchange relationship with the exhaust combustion gas flow, to the waste heat recovery exchanger.

The first working fluid circuit 11 further comprises a first expander 15 having an inlet in fluid communication with the waste heat recovery exchanger 7 and an outlet in fluid communication with a first pressure boosting device, such as a pump or compressor 17. Along the first working fluid circuit 11, between the first expander 15 and the first pressure or compressor 17, heat removal means are arranged, which remove low-temperature heat from the first working fluid. These heat removal means can comprise a first heat recuperator 19 and a first cooler 21. The first heat recuperator 19 embodies a heat transfer arrangement, for transferring heat from the first working fluid circuit 11 to the second working fluid circuit 13. The first working fluid flows in the heat-dispensing side of the first heat recuperator 19 in heat exchange relationship with the second working fluid, which flows in the heat-receiving side of the first heat recuperator 19, such that heat is transferred from the first working fluid to the second working fluid. The first working fluid is further cooled in the first cooler 21, exchanging heat with a heat sink, e.g. water or air.

According to some embodiments, the delivery side of the first pump or compressor 17 is fluidly coupled to a second heat recuperator 23. The first working fluid flows in the heat-receiving side of the second heat recuperator 23, in heat exchange relationship with the second working fluid, which flows in the heat-dispensing side of the second heat recuperator 23.

The first expander 15 and the first pump or compressor 17 divide the first working fluid circuit 11 into a high pressure side and a low pressure side. The high pressure side extends from the delivery side of the first pump or compressor 17 to the inlet side of the first expander 15. The low pressure side extends from the outlet of the first expander 15 to the suction side of the pump or compressor 17.

The second working fluid circuit 13 comprises the heat-receiving side of the first heat recuperator 19, an expander arrangement comprised of a second expander 25 and a second pressure boosting device, i.e. a second pump or compressor 27. Between the second expander 25 and the second pump or compressor 27 heat removing means are arranged. The heat removing means can include the heat-dispensing side of the second heat recuperator 23 and a second cooler 29, arranged between the second heat recuperator 23 and the second pump or compressor 27.

In the exemplary embodiment of FIG. 1 the first expander 15 is drivingly coupled to an electric generator 31. The first expander 15 can be directly connected to the electric generator 31. In other embodiments a gearbox 33 can be provided between the first expander 15 and the electric generator 31. The electric generator 31 can be electrically connected to an electric power distribution grid G. An electric power conditioning device 35 can be arranged between the electric generator 31 and the electric distribution grid G.

The second expander 25 can be drivingly coupled to the first pump or compressor 17, such that this latter is driven by mechanical power generated by the second expander 25.

The second pump or compressor can be driven by an electric motor 37 which can be connected to the electric power distribution grid G or directly to the electric generator 31. In some embodiments the electric motor 37 can be directly connected to the second pump or compressor 27. In other embodiments, as shown in FIG. 1, a gearbox 39 can be arranged between the second pump or compressor 27 and the electric motor 37.

The expander arrangement comprising the second expander 25 and the second pump or compressor 27 divide the second working fluid circuit 13 in a low pressure side, extending from the outlet of the second expander 25 to the suction side of the second pump or compressor 27, and a high pressure side, extending from the delivery side of the second pump or compressor 27 to the inlet of the second expander 25.

The system described so far operates as follows. The gas turbine engine 3 is powered by gaseous or liquid fossil fuel and generates mechanical power which is converted into electric power by the electric generator 5 and delivered to the electric power distribution grid G. The exhaust combustion gas of the gas turbine engine 3 flows through the heater 7 in heat exchange relationship with the first working fluid circulating in the first working fluid circuit 11. Heat from the combustion gas is exploited to evaporate the first working fluid, which is then expanded in the first expander 15. The enthalpy drop between across the first expander 15 is converted by the first expander 15 into mechanical power and the latter is in turn converted into electric power by the electric generator 31.

A by-pass line 41 with a by-pass valve 43 can be arranged in parallel to the first expander 15, such that part or the whole of the first working fluid flow can by-pass the first expander 15, e.g. during a start-up phase.

The expanded first working fluid exiting the first expander 15 flows through the heat-dispensing side of the first heat recuperator 19, where heat from the first working fluid is transferred to the second working fluid circulating in the second working fluid circuit 13. Low-pressure, partly cooled first working fluid is then further cooled in the first cooler 21 against a cooling medium, such as ambient air or water. The low-pressure, cooled first working fluid is then processed through the first pump or compressor 17, which boosts the pressure of the first working fluid from the low pressure of the low pressure side of the first working fluid circuit, to the high pressure of the high-pressure side of the first working fluid circuit 11.

The pressurized first working fluid is then pre-heated in the second heat recuperator 23 by heat exchange against the second working fluid circulating in the second working fluid circuit 13 and finally delivered to the heater 7 where it is evaporated again.

The second working fluid is heated and evaporated in the heat-receiving side of the second heat recuperator 19 and expanded in the second expander 25. The enthalpy drop across the second expander 25 is converted into mechanical power which is used to drive the first pump or compressor 17 of the first working fluid circuit 11. The expanded second working fluid from the second expander 25 is then cooled in the second heat recuperator 23, if provided, and in the second cooler 29. More specifically, the second working fluid flows in the heat-dispensing side of the second heat recuperator 23 in heat exchange relationship with the first working fluid which flows n the heat-receiving side of the second heat recuperator. In the second cooler 29 the expanded and partly cooled second working fluid is in heat exchange relationship with a cooling medium, such as air or water and is brought to the final bottom temperature of the cycle prior to being processed through the second pump or compressor 27. Therefrom, the pressurized second working fluid is delivered to the first heat recuperator 19 to be heated and evaporated again, and repeat the above described thermodynamic cycle.

The above described power conversion system converts high-temperature heat contained in the combustion gas of the gas turbine engine 3 into useful electric power through the electric generator 31. The net electric power produced by the system is reduced by the amount of electric power needed to drive the second pump or compressor 27, said amount of power being, however, much less than the total electric power generated by the electric generator 31. The first pump or compressor 17 is, conversely, driven by the second expander 25 and does not need to consume electric power provided by the electric generator 31 or by the electric distribution grid G.

Figure 2:
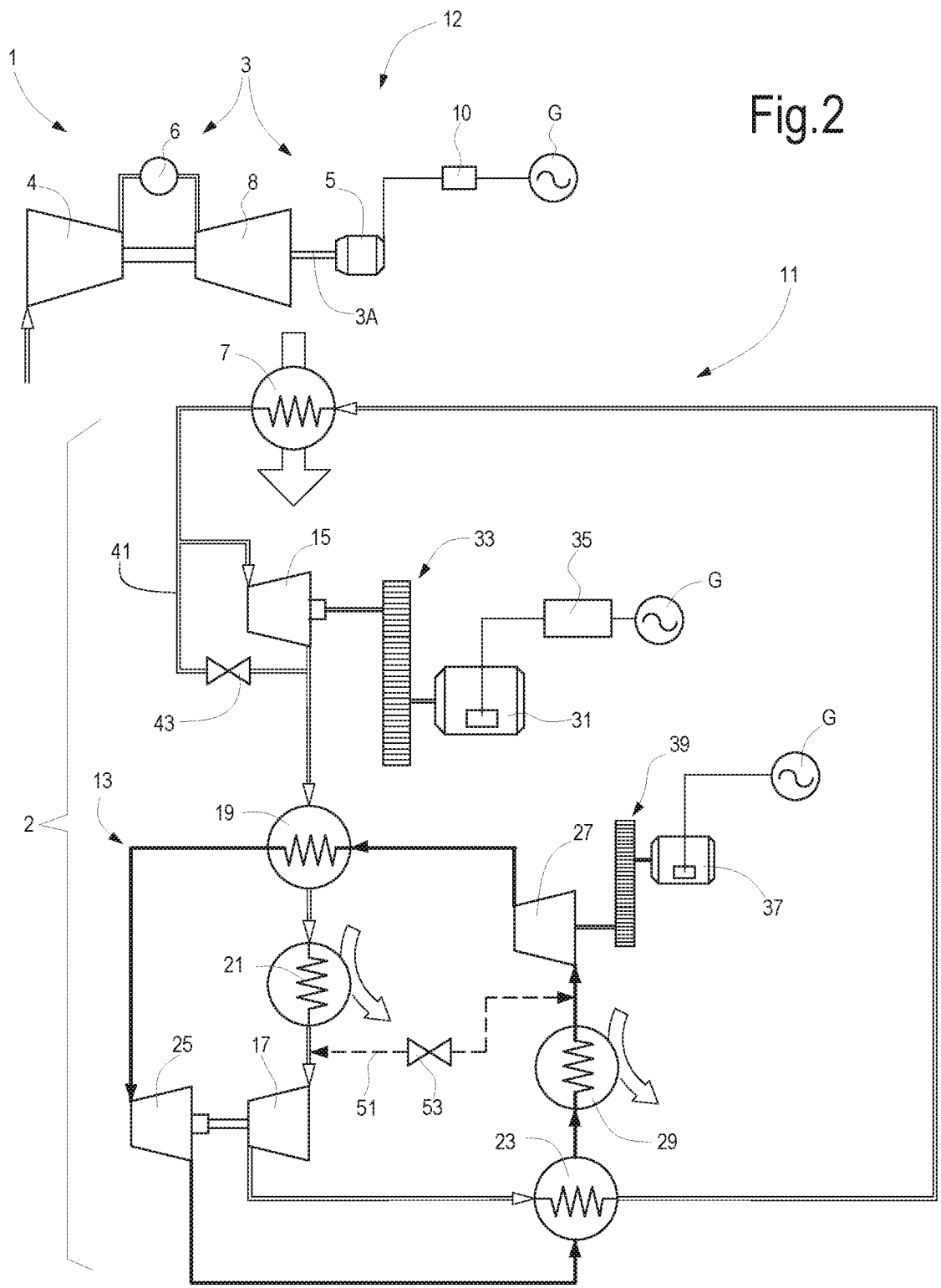

FIG. 2 illustrates the power conversion system 12 of FIG. 1, wherein a connection line 51 is provided between the second working fluid circuit 13 and the first working fluid circuit 11. A valve 53 is provided along the connection line 51. Acting upon the valve 53 working fluid can be caused to flow from one working fluid circuit to the other or vice-versa.

Figure 3:
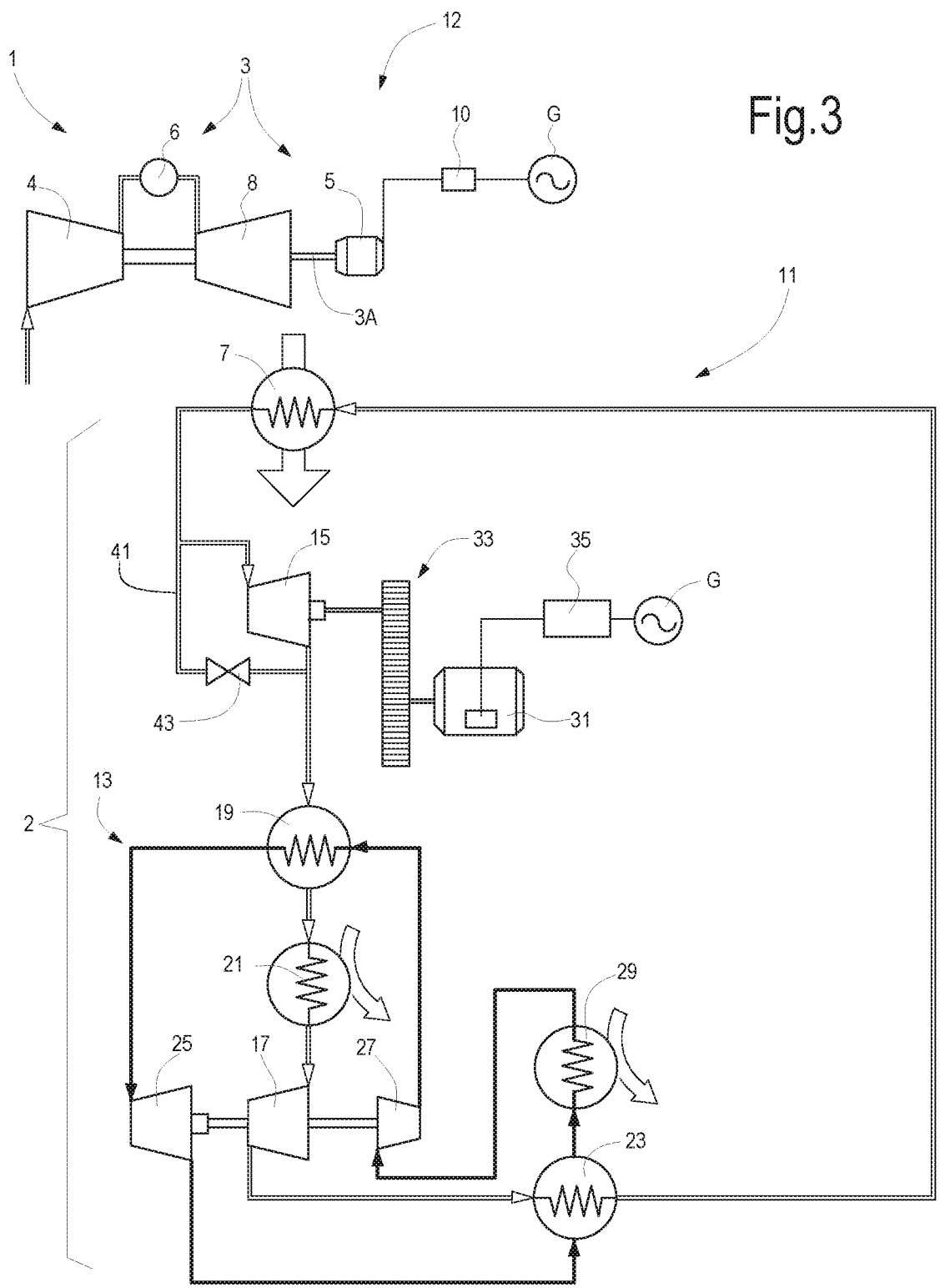

A further power conversion system according to the present disclosure is illustrated in FIG. 3. The same reference numbers designate the same or equivalent parts, components or elements as shown in FIG. 1, which will not be described again. In the power conversion system 12 of FIG. 3 both the first pump or compressor 17 and the second pump or compressor 27 are driven by the second expander 25. The electric motor 37 is thus dispensed with. A gear box (not shown) can be provided between the second expander 25 and the first pump or compressor 1 and/or between the second pump or compressor 27 and the first pump or compressor 17.

In some embodiments, the first pump or compressor 17 and the second pump or compressor 27 can be driven by two separate expanders, rather by the same expander, as illustrated in FIG. 3. In the exemplary embodiment of FIG. 4 an arrangement with two separate expanders for driving the first pump or compressor 17 and the second pump or compressor 27 is illustrated. The elements, parts or components corresponding or equivalent to those of FIG. 1 are labeled with the same reference numbers and will not be described again.

Figure 4:
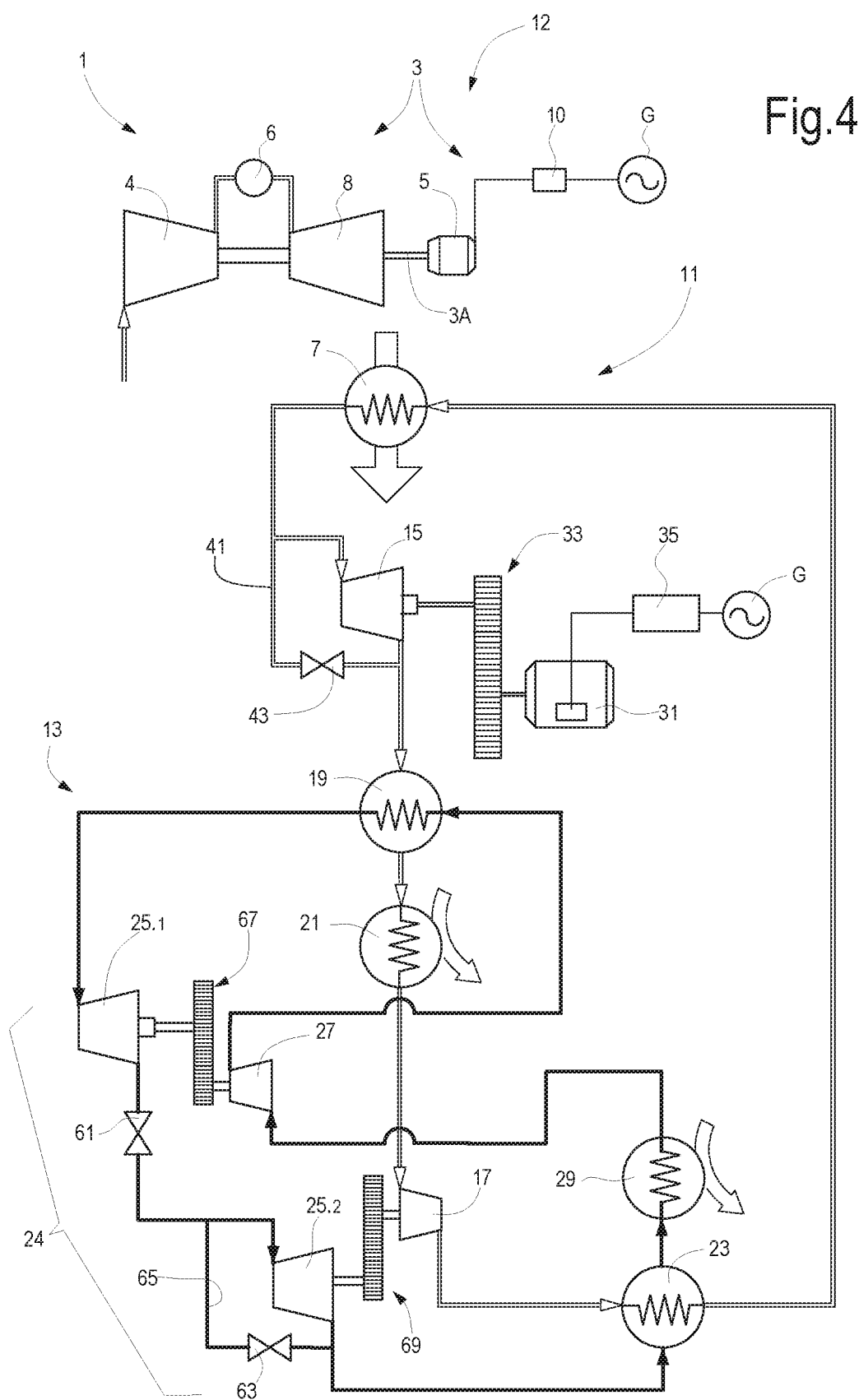

In the embodiment of FIG. 4 the second working fluid circuit 13 comprises an expander arrangement, globally labeled 24, comprised of a second expander 25.1 and a third expander 25.2. The second expander 25.1 and the third expander 25.2 are arranged in series along the second working fluid circuit 13. The second working fluid is thus firstly partly expanded in the second expander 25.1 and subsequently further expanded in the third expander 25.2. The second expander 25.1 is drivingly connected to the second pump or compressor 27, while the third expander 25.2 is drivingly connected to the first pump or compressor 17, such that mechanical power generated by the two enthalpy drops across the second expander 25.1 and the third expander 25.2 is used to drive both pumps or compressors 17, 27 of the power conversion system 12.

In some embodiments an adjusting valve 61 can be arranged along the second working fluid circuit 13, between the second expander 25.1 and the third expander 25.2. The adjusting valve 61 can be operated to adjust an intermediate pressure between the second expander 25.1 and the third expander 25.2, such that the enthalpy drop across the second expander 25.1 and the third expander 25.2 can be modified according to the operating conditions of the power conversion system 12.

In some embodiments, a by-pass valve 63 can be further provided along a by-pass line 65 arranged in parallel to the third expander 25.2, to adjust the mass flow of the second working fluid flowing through the third expander 25.2.

According to some embodiments, a gear box 67 can be arranged between second expander 25.1 and the second pump or compressor 27 driven thereby. In some embodiments, a gear box 69 can be arranged between the third expander 25.2 and the first pump or compressor 17.

Figure 5:
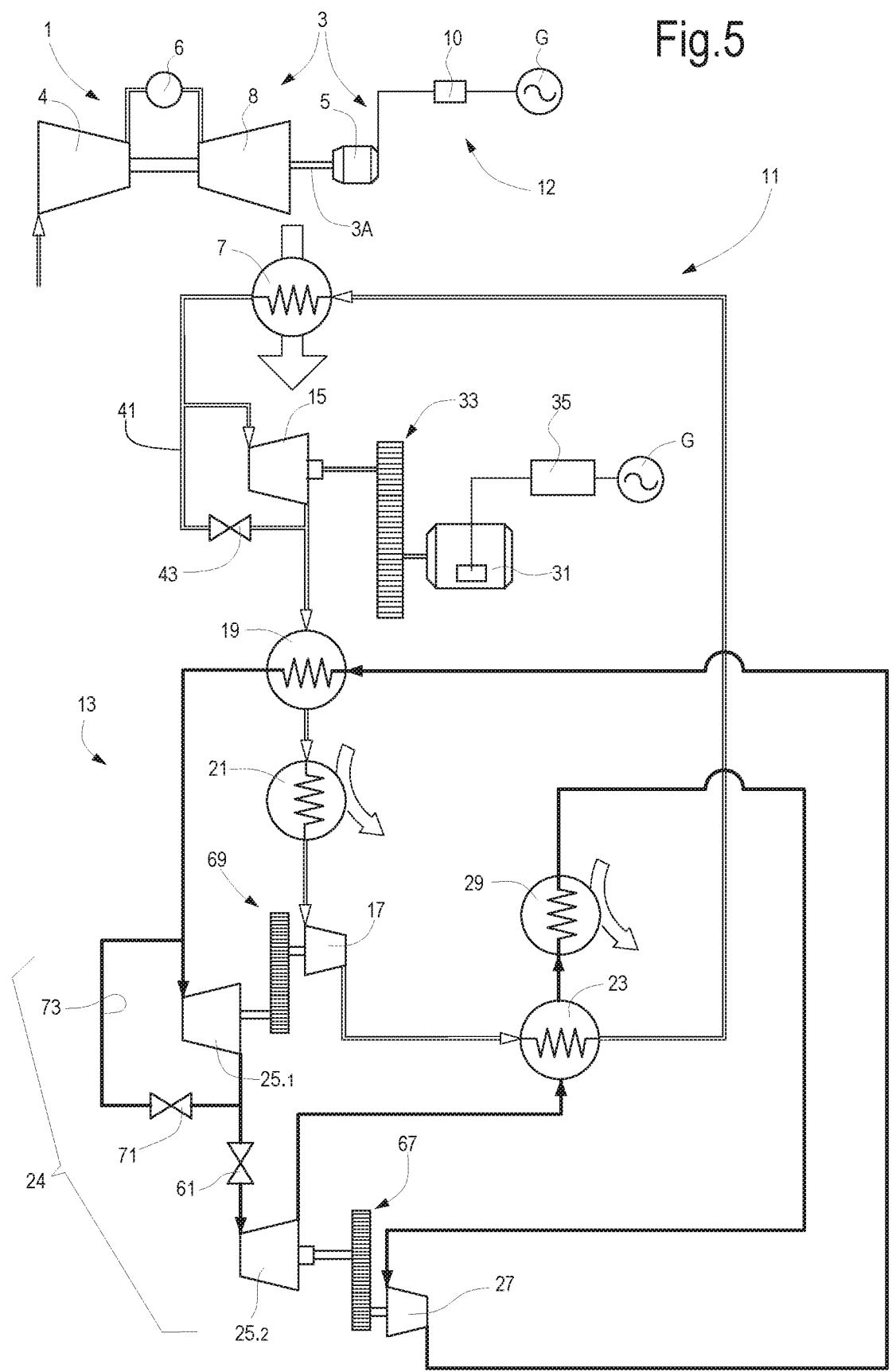

FIG. 5 illustrates a further embodiment of a power conversion system according to the present disclosure. The same reference numbers as used in FIGS. 1 to 4 designate the same or equivalent parts, components or elements, which will not be described again. In the embodiment of FIG. 5 the second working fluid circuit comprises an expander arrangement 24 which, similarly to the embodiment of FIG. 4, comprises a second expander 25.1 and a third expander 25.2. Differently from FIG. 4, however, according to the embodiment of FIG. 5 the second expander 25.1 is drivingly connected to the first pump or compressor 17, rather than to the second pump or compressor 27. The third expander 25.2 is in turn drivingly connected to the second pump or compressor 27. Gear boxes 67 and 699 can be provided between the expanders 25.1 and 25.2 and the respective pumps or compressors 17 and 27.

In the embodiment of FIG. 5 a by-pass valve 71 is arranged on a by-pass line 73 in parallel to the second expander 25.1, to adjust the mass flow of the second working fluid through the second expander 25.1 and tune the operation of the second expander 25.1 according to the operating conditions of the power conversion system 12.

Several additional modifications of the power conversion systems described herein are possible. For instance, one, some or all the gear boxes provided in any one of the embodiments disclosed herein can be replaced by variable speed drives, which allow a variation of the transmission ratio between an inlet shaft and an outlet shaft, thus providing additional adjustment options. Additionally, further pressure adjustment valves or flow adjustment valves can be provided in the first working fluid circuit 11 or in the second working fluid circuit 13.

Each expander described herein in connection to the various embodiments can be a single-stage or a multi-stage expander, or else can in actual fact be comprised of two or more expanders arranged in series or in parallel. The expanders can be axial expanders, radial expander or mixed expanders. Variable inlet guide nozzles can further be provided at the inlet of one or more of the expanders or single stages thereof, providing additional degrees of freedom for adjusting the operating conditions of the expanders.

As mentioned above, while in FIGS. 1 to 5 the heat source which provides heat to the first working fluid circuit 11 and the second working fluid circuit 13 is exhaust gas from a gas turbine engine, in other embodiments, heat from a different heat source can be provided. For instance, heat from a concentrated solar power plant, waste heat from an internal reciprocating engine, and more in general any industrial waste heat can be used.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power conversion system comprising:
   a first working fluid circuit having a high pressure side and a low pressure side and configured to flow a first working fluid therethrough;
   a heater configured to circulate the first working fluid in heat exchange relationship with a heat source to vaporize the first working fluid;
   a first expander arranged between the high pressure side and the low pressure side of the first working fluid circuit, configured to expand the first working fluid therein and generate mechanical power therewith;
   a first pump or compressor arranged between the low pressure side and the high pressure side of the first working fluid circuit;
   a second working fluid circuit having a high pressure side and a low pressure side and configured to flow a second working fluid therethrough;
   a heat transfer arrangement, configured for transferring heat from the low pressure side of the first working fluid circuit to the high pressure side of the second working fluid circuit and vaporize the second working fluid;
   an expander arrangement arranged between the high pressure side and the low pressure side of the second working fluid circuit, configured to expand the second working fluid therein and generate mechanical power therewith;
   a second pump or compressor arranged between the low pressure side and the high pressure side of the second working fluid circuit;
   a heat recuperator, with a heat-dispensing side in heat exchange relationship with a heat-receiving side, the heat-dispensing side being fluidly coupled to the second working fluid circuit and the heat-receiving side being fluidly coupled to the first working fluid circuit, such that heat is transferred from the second working fluid, circulating in the heat-dispensing side of the heat recuperator, to the first working fluid circulating in the heat-receiving side of the heat recuperator;
   wherein the first pump or compressor is drivingly coupled to the expander arrangement and driven by mechanical power generated therewith.

2. The power conversion system of claim 1, wherein the first expander is drivingly coupled to a rotating load.

3. The power conversion system of claim 1, wherein the rotating load comprises an electric generator, configured for converting mechanical power generated by the first expander into electric power.

4. The power conversion system of claim 1, wherein the second pump or compressor is drivingly coupled to an electric motor.

5. The power conversion system of claim 1, wherein the second pump or compressor is drivingly coupled to the expander arrangement, whereby both the first pump or compressor and the second pump or compressor are driven by mechanical power generated by the expander arrangement.

6. The power conversion system of claim 1, wherein the expander arrangement comprises a second expander, drivingly coupled to a shaft line, and wherein the first pump or compressor and the second pump or compressor are drivingly coupled to the shaft line.

7. The power conversion system of claim 1, wherein the expander arrangement comprises a top expander and a bottom expander arranged in series between the high pressure side and the low pressure side of the second working fluid circuit, such that the second working fluid is sequentially expanded in the top expander and in the bottom expander, and wherein one of the first pump or compressor and second pump or compressor (27) is drivingly coupled to the top expander and the other of the first pump or compressor and second pump or compressor is drivingly coupled to the bottom expander.

8. The power conversion system of claim 1, wherein the heat transfer arrangement comprises a first heat recuperator, with a heat-dispensing side in heat exchange relationship with a heat-receiving side, the heat-dispensing side being fluidly coupled to the first working fluid circuit and the heat-receiving side being fluidly coupled to the second working fluid circuit, such that heat is transferred from the first working fluid circulating in the heat-dispensing side of the first heat recuperator to the second working fluid circulating in the heat-receiving side of the first heat recuperator.

9. The power conversion system of claim 8, wherein the heat-dispensing side of the first heat recuperator is fluidly coupled to the first working fluid circuit between the first expander and the first pump or compressor, and the heat-receiving side of the first heat recuperator is fluidly coupled to the second working fluid circuit between the second pump or compressor and the expander arrangement.

10. The power conversion system of claim 8, wherein the first working fluid circuit further comprises a first cooler, fluidly coupled to the first working fluid circuit between the heat-dispensing side of the first heat recuperator and the first pump or compressor.

11. The power conversion system of claim 1, wherein the high-temperature side of the heat recuperator is fluidly coupled to the second working fluid circuit between the expander arrangement and the second pump or compressor, and the low-temperature side of the heat recuperator is fluidly coupled to the first working fluid circuit between the first pump or compressor and the heater.

12. The power conversion system of claim 1, wherein the second working fluid circuit further comprises a second cooler, fluidly coupled to the second working fluid circuit between the heat recuperator and the second pump or compressor.

13. The power conversion system of claim 1, further comprising a connection line between the first working fluid circuit and the second working circuit, configured for transferring working fluid from the first working fluid circuit to the second working fluid circuit or vice-versa, a valve being disposed on the connection line.

14. A method for producing useful power from heat from a heat source, comprising:
circulating a first working fluid by means of a first pump or compressor through a first working fluid circuit having a high pressure side and a low pressure side, wherein the high pressure side of the first working fluid circuit is in heat exchange relationship with the heat source and the low pressure side of the first working fluid circuit is in heat exchange relationship with a second working fluid circuit;
transferring thermal energy from the heat source to the first working fluid;
expanding the first working fluid through a first expander arranged between the high pressure side of the first working fluid circuit and the low pressure side of the first working fluid circuit, and generate mechanical power therewith;
transferring low-temperature heat from the first working fluid circuit to the second working fluid circuit; wherein the second working fluid circuit comprises a high pressure side and a low pressure side, an expander arrangement between the high pressure side of the second working fluid circuit and the low pressure side of the second working fluid circuit, and a second pump or compressor between the low pressure side of the second working fluid circuit and the high pressure side of the second working fluid circuit;
expanding a second working fluid circulating in the second working fluid circuit in the expander arrangement and generating mechanical power therewith;
transferring heat from the second working fluid circuit to the first working fluid circuit by means of a heat recuperator;
driving the first pump or compressor by means of mechanical power generated by the expander arrangement.

15. The method of claim 14, further comprising rotating a load with mechanical power generated by the first expander.

16. The method of claim 14, wherein the load comprises an electric generator; the method further comprising converting mechanical power generated by the first expander into electric power by means of the electric generator.

17. The method of claim 14, further comprising rotating the second pump or compressor by means of mechanical power generated by the expander arrangement.

18. The method of claim 17, wherein the expander arrangement comprises a second expander and a third expander sequentially arranged between the high pressure side of the second working fluid circuit and the low pressure side of the second working fluid circuit, and further comprising sequentially expanding the second working fluid in the second expander and third expander; rotating the first pump or compressor with mechanical power generated by one of the second expander and third expander; and rotating the second pump or compressor with mechanical power generated by the other of the second expander and third expander.

* * * * *